(12) United States Patent
Zhu et al.

(10) Patent No.: US 10,325,190 B1
(45) Date of Patent: Jun. 18, 2019

(54) DATA PROCESSING METHOD AND NETWORK EQUIPMENT

(71) Applicant: ENN SCIENCE AND TECHNOLOGY DEVELOPMENT CO., LTD, Langfang (CN)

(72) Inventors: Bryan Zhu, Holmdel, NJ (US); Zhenqi Zhu, Langfang (CN)

(73) Assignee: ENN SCIENCE AND TECHNOLOGY DEVELOPMENT CO., LTD, Langfang, Hebei (CN)

( * ) Notice: Subject to any disclaimer, the term of this patent is extended or adjusted under 35 U.S.C. 154(b) by 0 days.

(21) Appl. No.: 15/894,816

(22) Filed: Feb. 12, 2018

(30) Foreign Application Priority Data

Feb. 1, 2018 (CN) .......................... 2018 1 0103667

(51) Int. Cl.
  *G06K 19/00* (2006.01)
  *G06K 19/06* (2006.01)

(52) U.S. Cl.
  CPC .............................. *G06K 19/06037* (2013.01)

(58) Field of Classification Search
  USPC .................................. 235/435, 439, 454, 462
  See application file for complete search history.

(56) References Cited

U.S. PATENT DOCUMENTS

2015/0294118 A1* 10/2015 Parker ................... G06F 21/606
  726/26

* cited by examiner

*Primary Examiner* — Matthew Mikels
(74) *Attorney, Agent, or Firm* — Ladas & Parry, LLP (57) ABSTRACT

The present disclosure discloses a data processing method and a network equipment. The method comprises steps of: acquiring index data of a product in N dimensions, the N being a natural number greater than or equal to 1; normalizing index data in the $i^{th}$ dimension to determine a result of evaluation of the product in the $i^{th}$ dimension, the i being a natural number that is greater than or equal to 1 but less than or equal to N; and, generating a QR code for the product, the QR code carrying the results of evaluation in the N dimensions.

8 Claims, 4 Drawing Sheets

DATA PROCESSING METHOD AND NETWORK EQUIPMENT

CROSS-REFERENCE TO RELATED APPLICATION

This application claims priority to Chinese Patent Application No. 201810103667.2, filed on Feb. 1, 2018, titled "DATA PROCESSING METHOD AND DEVICE", which is incorporated herein by reference in its entirety.

FIELD OF TECHNOLOGY

The present disclosure relates to the technical field of computers and in particular to a data processing method and a network equipment.

BACKGROUND OF THE INVENTION

In the $21^{st}$ century, the world is in a fast-growing era of network information. As the first production factor, data is also an important basis for the information society. However, a large amount of data is fragmentized seriously, and the fragmentized data is inconveniently used by users. Particularly for commercial products, the index data of the products are fragmentized seriously, so that it is difficult for consumers to comprehensively know the advantages and disadvantages of the products. Therefore, how to improve the availability of fragmentized index data is a problem to be urgently solved.

SUMMARY OF THE INVENTION

The present disclosure provides a data processing method and network equipment, which are convenient for consumers to comprehensively know the advantages and disadvantages of a product.

For this purpose, the present disclosure employs the following technical solutions.

In a first aspect, the present disclosure provides a data processing method, including steps of:

acquiring index data of a product in N dimensions, the N being a natural number greater than or equal to 1;

normalizing index data in the $i^{th}$ dimension to determine a result of evaluation of the product in the $i^{th}$ dimension, the i being a natural number that is greater than or equal to 1 but less than or equal to N; and generating a QR code for the product, the QR code carrying the results of evaluation in the N dimensions.

By this method, various pieces of fragmentized index data of a product are collected, the pieces of index data are then normalized, and these pieces of fragmentized index data are converted into intuitive results of evaluation, so that the availability of fragmentized index data is improved and it is convenient for consumers to comprehensively know the advantages and disadvantages of this product.

In a second aspect, an embodiment of the present disclosure provides a data processing device, including:

an acquisition module configured to acquire index data of a product in N dimensions, the N being a natural number greater than or equal to 1;

a processing module configured to normalize index data in the $i^{th}$ dimension to determine a result of evaluation of the product in the $i^{th}$ dimension, the i being a natural number that is greater than or equal to 1 but less than or equal to N; and a generation module configured to generate a QR code for the product, the QR code carrying the results of evaluation in the N dimensions.

In a third aspect, the present disclosure provides a network equipment, including a processor and a memory. Computer-executable instructions are stored in the memory. When the network equipment operates, the processor executes the computer-executable instructions stored in the memory, so that the network equipment executes the data processing method described in the first aspect and any one of various optional implementations thereof.

In a fourth aspect, the present disclosure provides a computer-readable storage medium with instructions stored therein. When the computer equipment executes the instructions, the computer equipment executes the data processing method described in the first aspect and any one of various optional implementations thereof.

The beneficial effects of the second aspect to the fourth aspect can refer to the related descriptions of the first aspect and will not be repeated here.

DETAILED DESCRIPTION OF THE PREFERRED EMBODIMENTS

The technical solutions in the embodiments of the present disclosure will be clearly and completely described below with reference to the accompanying drawings in the embodiments of the present disclosure.

Figure 1:
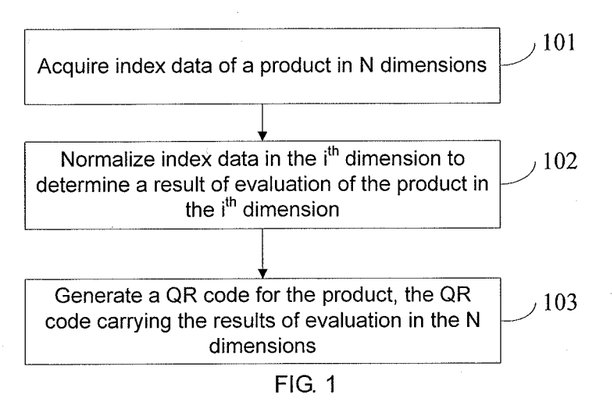
FIG. 1 is a flowchart of a data processing method according to an embodiment of the present disclosure.

As shown in FIG. 1, an embodiment of the present disclosure provides a data processing method. This method is executed by a network equipment, for example, a server or the like. This method includes the following steps 101 to 103.

Step 101: Index data of a product in N dimensions is acquired.

Exemplarily, the product is an electronic product, such as a mobile phone or a computer, or the product is a virtual product, such as software or a network tool. The product may also be products of other types, and the type of the product will not be limited in this embodiment of the present invention.

The N is a natural number greater than or equal to 1. The index data in the N dimensions includes but is not limited to: product type, rank, function, quality, cost, life cycle cost, user friendliness and history of the product.

In an optional implementation, the network equipment acquires the index data in the N dimensions by a network crawler, a data cloud platform, manually inputting or in other ways.

Optionally, after the index data of the product in the N dimensions is acquired, the index data is preprocessed. The preprocessing includes: data cleaning and data conversion. The data cleaning is a process of reexamining and verifying the data in order to correct errors in the data. The data conversion is a process of converting the data according to a certain rule, such as square root conversion, logarithmic conversion or the like.

Optionally, after the index data of the product in the N dimensions is acquired, the network equipment sets a corresponding digital list for the product. The digital list is used for storing the index data of the product in the N dimensions, and the digital list may be implemented in the form of a table. The digital list may be available to users, so that it is convenient for users to modify or maintain data in the data list, and the confidence level of data in the digital list is thus improved.

Step 102: Index data in the $i^{th}$ dimension is normalized to determine a result of evaluation of the product in the $i^{th}$ dimension.

The i is a natural number that is greater than or equal to 1 but less than or equal to N.

Optionally, the result of evaluation is implemented in the form of a score. For example, the result of evaluation is a value in (1, 2, 3, 4, 5). Alternatively, the result of evaluation is implemented in the form of text description. For example, the result of evaluation is one of (excellent, good, poor). Of course, the result of evaluation may also be manifested in other forms, and this will not be limited in this embodiment of the present disclosure.

In an optional implementation, the result of evaluation of the product in the $i^{th}$ dimension is determined according to a preset correspondence between index data in the $i^{th}$ dimension and results of evaluation. Exemplarily, Table 1 shows a preset correspondence between mobile phone brands and results of evaluation.

TABLE 1

| Mobile phone brand | Result of evaluation |
| --- | --- |
| IPhone | Frist-class manufacturer |
| Huawei | Second-class manufacturer |
| Coolpad | Third-class manufacturer |

Optionally, in the N dimensions of the product, there is a corresponding set of results of evaluation in each dimension. For example, in the dimension of product type, a set of results of evaluation is (A1, A2, A3 . . . ); in the dimension of function, a set of results of evaluation is (B1, B2, B3 . . . ); and, in the dimension of quality, a set of results of evaluation is (C1, C2, C3 . . . ). In this way, comprehensive information of the product can be determined by matching the results of evaluation with the index data of the product in the N dimensions. The comprehensive information includes the results of evaluation of the product in the N dimensions.

By taking a notebook computer as example, in the dimension of product type, the set of results of evaluation on the notebook computer is (entertainment & game, business, lightweight & portable, home audio); in the dimension of brand, the set of results of evaluation on the notebook computer is (first-class manufacturer, second-class manufacturer, third-class manufacturer); and, in the dimension of quality, the set of results of evaluation on the notebook computer is (durable, ordinary, non-durable). Therefore, for a certain notebook computer, the comprehensive information is (entertainment & game, second-class manufacturer, durable).

In another optional implementation, if the $i^{th}$ dimension includes at least two pieces of index data, a score for each piece of index data in the $i^{th}$ dimension is determined according to a preset correspondence between index data in the $i^{th}$ dimension and scores; and then, the result of evaluation of the production in the $i^{th}$ dimension is determined according to the following formula:

$$P = \sum_{j=1}^{n} F_j \times \alpha_j,$$

where P denotes the result of evaluation of the product in the $i^{th}$ dimension, $F_j$ denotes a score corresponding to the $j^{th}$ piece of index data of the product in the $i^{th}$ dimension, $\alpha_j$ denotes a weight value corresponding to the $j^{th}$ piece of index data of the product in the $i^{th}$ dimension, and n is a natural number greater than 1.

The following description will be given by taking the dimension of function as example.

A product generally has a plurality of functions. For example, a mobile phone has a communication function, a camera function or the like. That is, in the dimension of function, the product has multiple pieces of index data, for example, index data of the communication function, index data of the camera function or the like. Thus, scores corresponding to different functions of the product are determined according to a preset correspondence between functions and scores. Exemplarily, Table 2 shows the correspondence between functions and scores.

TABLE 2

| Function | Score |
| --- | --- |
| Camera function | 5 |
| Communication function | 20 |
| Recording function | 4 |
| Waterproof function | 10 |

Then, the result of evaluation of the product in the dimension of function is determined according to the following formula:

$$H = \sum_{j=1}^{n} A_j \times \beta_j.$$

H denotes the result of evaluation of the product in the dimension of function, $A_j$ denotes a score corresponding to the $j^{th}$ function, and $\beta_j$ denotes a weight value corresponding to the $j^{th}$ function.

Optionally, the functions are different in importance. Therefore, the functions of the product may be classified to basic functions and additional functions. Since the basic functions are more important, the weight values corresponding to the basic functions are larger. Since the additional functions are less important, the weight values corresponding to the additional functions are smaller. For example, a weight value corresponding to a basic function is set to 80%, while a weight value corresponding to an additional function is set to 20%.

It is to be noted that, whether a function is a basic function or an additional function is mainly determined according to the product. With reference to Table 2, by taking the product being a mobile phone as example, the communication function is a basic function, while the camera function, the recording function and the waterproof function are additional functions.

Optionally, since the result of evaluation can reflect the evaluation on a product in its corresponding dimension, the quality or rank of products of the same type can be determined according to the results of evaluation on at least two products of the same type in the same dimension. Optionally, the result of evaluation in the $i^{th}$ dimension is compared with result(s) of evaluation of at least one other product of the same type in a corresponding dimension to determine the rank of the product in the $i^{th}$ dimension. For example, if the result of evaluation of a product 1 in the dimension of function is 5, the result of evaluation of a product 2 in the dimension of function is 3 and the result of evaluation of a product 3 in the dimension of function is 7, it can be determined that the product 1 is ranked in the second place in the dimension of function.

Optionally, after the result of evaluation of the product in the $i^{th}$ dimension is determined, a server receives a modification instruction transmitted by a user terminal; and then, the server modifies, according to the modification instruction, the result of evaluation of the product in the $i^{th}$ dimension. Thus, the result of evaluation of the product in the $i^{th}$ dimension is closer to the user's actual feeling, and the accuracy of evaluation on the product is improved. For example, after the index data in the dimension function is normalized, the server determines that the result of evaluation of the product in the dimension of function is 9. The user may be dissatisfied with 9 and may want to modify the score to 8. In this case, the user may transmit a modification instruction to the server via the user terminal. Thus, upon receiving the modification instruction transmitted by the user terminal, the server modifies the result of evaluation in the dimension of function to 8.

Optionally, the modification instruction includes the result of evaluation of the product in the $i^{th}$ dimension. Of course, the modification instruction may further include other contents, and this will not be limited in this embodiment of the present disclosure.

Step 103: A QR code is generated for the product, the QR code carrying the results of evaluation in the N dimensions.

Figure 2:
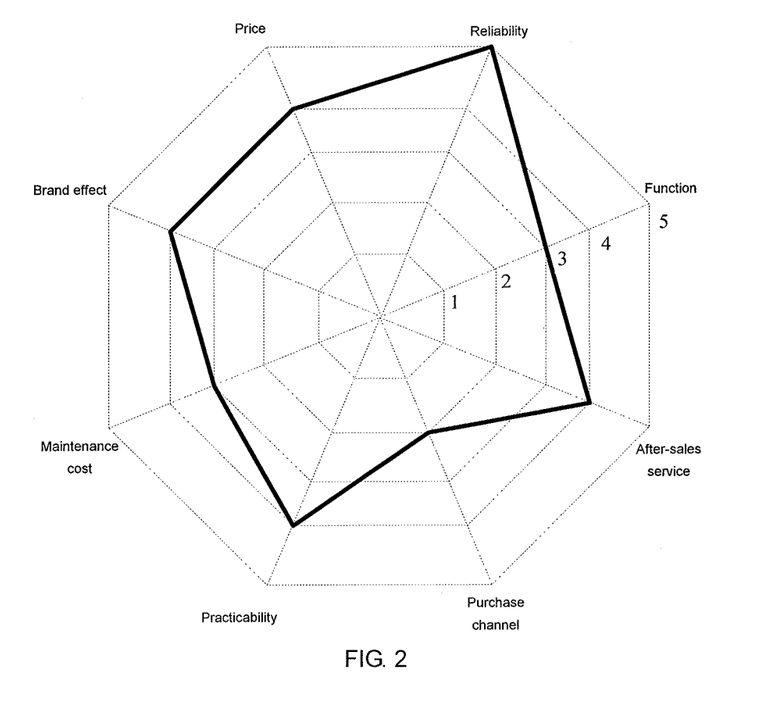
FIG. 2 is a radar graph according to an embodiment of the present disclosure.

In an optional implementation, a data point on the $i^{th}$ coordinate axis is generated according to the result of evaluation in the $i^{th}$ dimension, and data points on adjacent coordinate axes are successively connected to generate a radar graph of the product. It is to be noted that each coordinate axis on the radar graph corresponds to one dimension of the product. Exemplarily, the radar graph of the product is shown in FIG. 2. In the radar graph of FIG. 2, coordinate axes in different dimensions are radiated from the center. A farther data point on a coordinate axis indicates a better result of evaluation of the product in the corresponding dimension. By taking the coordinate axis corresponding to the dimension of function as example, the results of evaluation corresponding to nodes on the coordinate axis, from the inside out, are successively: 1, 2, 3, 4 and 5. After the radar graph of the product is generated, a QR code body region for the product is generated from the results of evaluation of the product in the N dimensions. Eventually, a visual QR code for the product is generated by using the radar graph of the product as a background graph and in combination with the QR code body region for the product.

In this way, the user can intuitively know the results of evaluation of the product in the N dimensions through the visual QR code, and thus comprehensively know the advantages and disadvantages of the product.

Of course, the background graph of the visual QR code for the product may also be other patterns (for example, a broken line graph), and this will not be limited in this embodiment of the present disclosure.

Optional implementations of generating the visual QR code for the product will be described below.

Step S1: Salient image features are extracted from the background graph iteratively by a Flow-based Difference-of-Gaussians (FDoG) algorithm, and a visual multi-feature image is generated from the salient image features.

Step S2: A foreground region and a background region are acquired by a background subtraction algorithm.

Step S3: A QR code body region similar to the visual multi-feature image is selected based on a Mean Structural Similarity (MSSIM) index.

To realize a better visual effect of the visual QR code, generally, different QR code body regions will be generated according to different QR code masks. Then, a QR code body region among these QR code body regions which is similar to the visual multi-feature image is selected based on the MSSIM index.

Optionally, the algorithm used in the selection process is a graph cut algorithm.

Step S4: The background region of the background graph is filled with a module corresponding to the selected QR code body region to generate a visual QR code.

Due to some factors, an error may occur in lattices of the generated visual QR code, so that the user terminal cannot scan out information or scans out wrong information. Therefore, a step S5 may be executed subsequently.

Step S5: Lattices of the visual QR code are restored.

Optionally, the gray value of the visual QR code is compared with the gray value of the QR code body region at each lattice, and lattices having a difference in gray value exceeding a preset threshold are restored. Exemplarily, the restoration includes: setting the gray value of a lattice of the visual QR code as the gray value of the corresponding lattice of the QR code body region.

Figure 3:
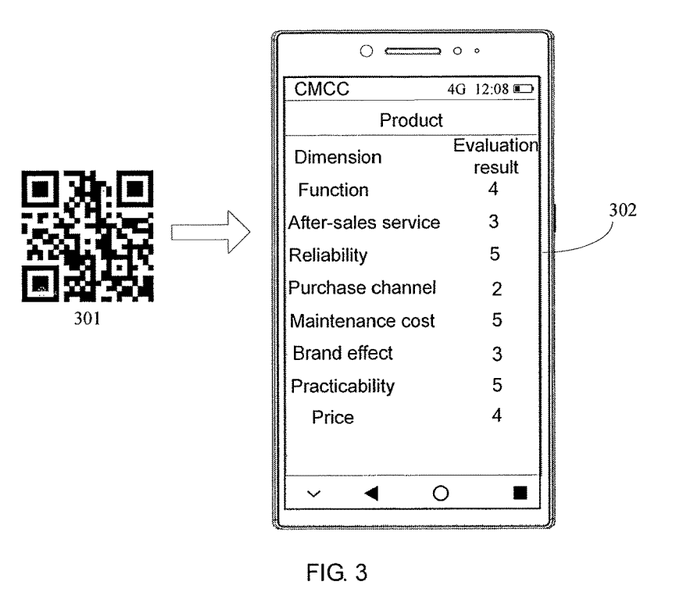
FIG. 3 is a first schematic diagram of scanning a QR code by a user terminal according to an embodiment of the present disclosure.

It can be understood that, when the user terminal scans the QR code for the product, the user terminal can acquire the results of evaluation of the product in the N dimensions. Exemplarily, as shown in FIG. 3, after the user terminal scans a QR code 301, the corresponding results of evaluation of the product in the N dimensions are displayed on an interface 302 of the user terminal.

Figure 4:
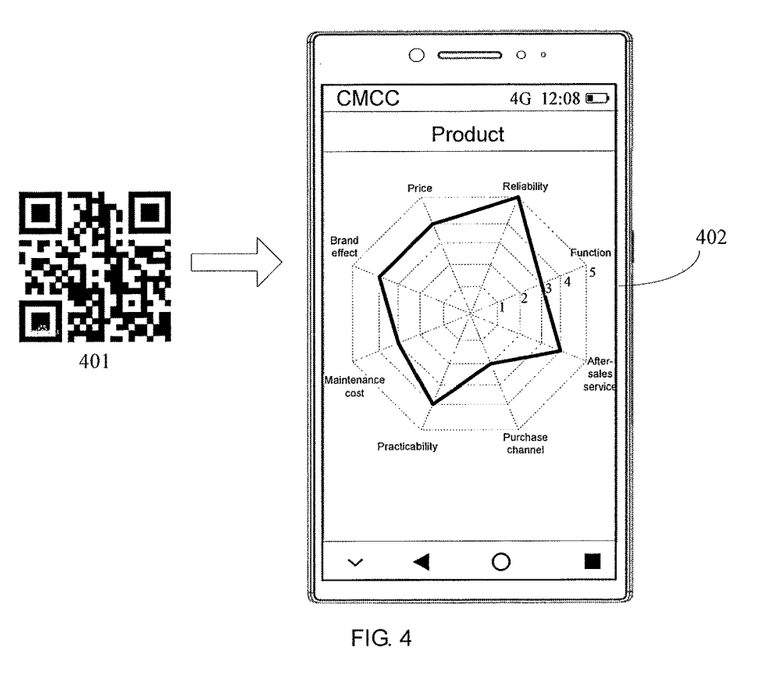
FIG. 4 is a second schematic diagram of scanning a QR code by a user terminal according to an embodiment of the present disclosure.

Optionally, after the user terminal scans the QR code for the product, the results of evaluation of the product in the N dimensions are displayed on the user terminal in the form of a chart. Exemplarily, as shown in FIG. 4, after the user terminal scans a QR code 401, the results of evaluation of the product in the N dimensions are displayed on an interface 402 of the user terminal in the form of a radar graph. Thus, the user can intuitively know the results of evaluation of the product in the N dimensions.

Figure 5:
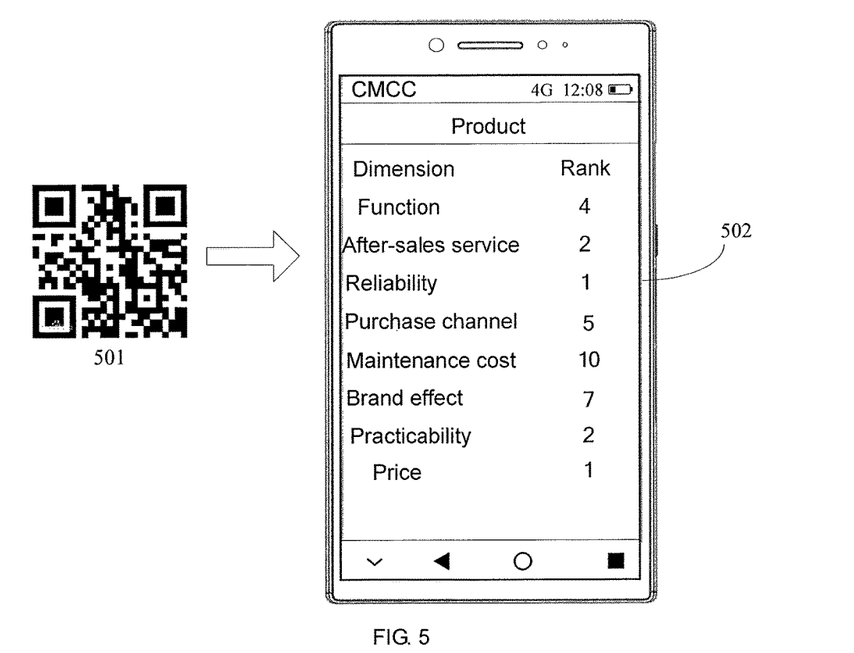
FIG. 5 is a third schematic diagram of scanning a QR code by a user terminal according to an embodiment of the present disclosure.

Optionally, the QR code further carries the ranks of the product in the N dimensions. In this way, after the user terminal scans the QR code for the product, the ranks of the product in the N dimensions are displayed on the user terminal. Exemplarily, as shown in FIG. 5, after the user terminal scans a QR code 501, the ranks of the product in the N dimensions are displayed on an interface 502 of the user terminal.

Optionally, the QR code for the product further carriers an identifier of the product. In this way, after the user terminal scans the QR code for the product, the user terminal can inquire, from a cloud server, other information of the product according to the identifier of the product.

In this embodiment of the present invention, the functional modules or functional units of the network equipment can be divided by the method examples. For example, the functional modules or functional units can be divided with respect to each function; alternatively two or more functions can be integrated into one processing module. The integrated module can be implemented in the form of hardware, or can be implemented in the form of a software functional module or a functional unit. The division of modules or units in this embodiment of the present invention is illustrative and merely a logic function division. In practical implementations, there can be other division methods.

Figure 6:
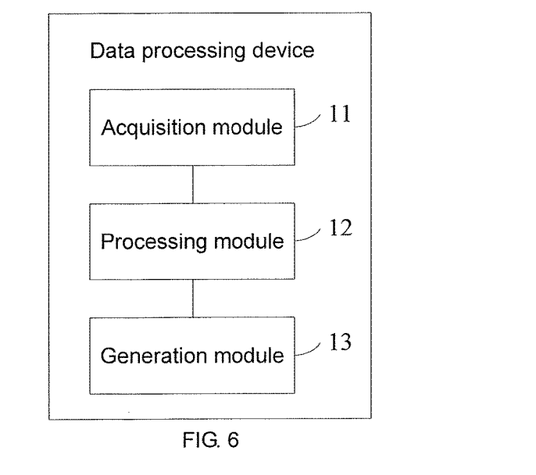
FIG. 6 is a schematic structure diagram of a data processing device according to an embodiment of the present disclosure.

As shown in FIG. 6, an embodiment of the present disclosure provides a data processing device, including: an acquisition module 11, a processing module 12 and a generation module 13.

The acquisition module 11 is configured to acquire index data of a product in N dimensions, the N being a natural number greater than or equal to 1.

The processing module 12 is configured to normalize index data in the $i^{th}$ dimension to determine a result of evaluation of the product in the $i^{th}$ dimension, the i being a natural number that is greater than or equal to 1 but less than or equal to N.

The generation module 13 is configured to generate a QR code for the product, the QR code carrying the results of evaluation in the N dimensions.

In an optional implementation, the processing module 12 is configured to determine, according to a preset correspondence between index data in the $i^{th}$ dimension and results of evaluation, the result of evaluation of the product in the $i^{th}$ dimension.

In an optional implementation, the processing module 12 is configured to determine a score for each piece of index data in the $i^{th}$ dimension, according to a preset correspondence between index data in the $i^{th}$ dimension and scores, when the $i^{th}$ dimension includes at least two pieces of index data; and, determine a result of evaluation of the product in the $i^{th}$ dimension according to the following formula:

$$P = \sum_{j=1}^{n} F_j \times \alpha_j.$$

In the formula, P denotes the result of evaluation of the product in the $i^{th}$ dimension, $F_j$ denotes a score corresponding to the $j^{th}$ piece of index data of the product in the $i^{th}$ dimension, $\alpha_j$ denotes a weight value corresponding to the $j^{th}$ piece of index data of the product in the $i^{th}$ dimension, and n is a natural number greater than 1.

In an optional implementation, the generation module 13 is configured to generate a data point on the coordinate axis according to the result of evaluation in the $i^{th}$ dimension, and successively connect data points on adjacent coordinate axes to generate a radar graph of the product; generate a QR code body region for the product from the results of evaluation of the product in the N dimensions; and, generate a visual QR code for the product by using the radar graph of the product as a background graph and in combination with the QR code body region for the product.

In an optional implementation, the processing module 12 is configured to compare the result of evaluation in the $i^{th}$ dimension with result(s) of evaluation of at least one other product of the same type in a corresponding dimension to determine a rank of the product in the $i^{th}$ dimension. The generation module 13 is configured to generate a QR code for the product according to the results of evaluation and the ranks in the N dimensions, the QR code carrying the results of evaluation and the ranks in the N dimensions.

In an optional implementation, the acquisition module 11 is configured to receive a modification instruction transmitted by a user terminal. The processing module 12 is configured to modify the result of evaluation of the product in the $i^{th}$ dimension according to the modification instruction.

Figure 7:
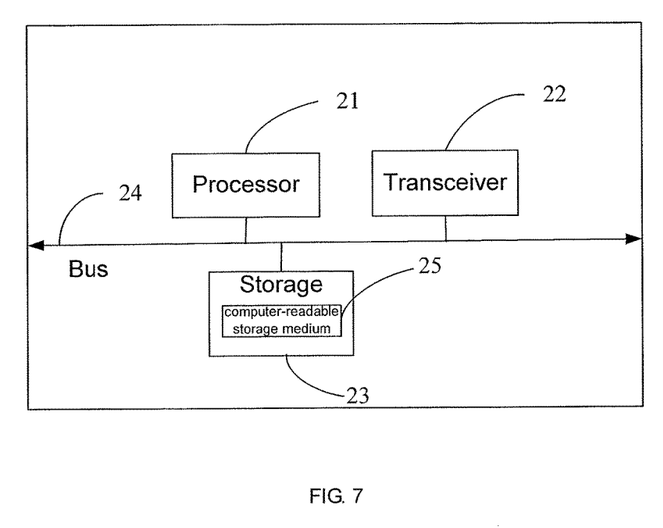
FIG. 7 is a schematic structural diagram of a network equipment according to an embodiment of the present disclosure.

FIG. 7 shows a possible schematic structure diagram of the network equipment in this embodiment. The network equipment includes a processor 21. The processor 21 is configured to execute the steps executed by the acquisition module 11, the processing module 12 and the generation module 13, and/or configured to execute other processes of the technology described herein. The network equipment can further include a transceiver 22, a storage 23 and a bus 24. The transceiver 22 is configured to support the communication between the network equipment and other equipments. The storage 23 is configured to store program codes and data of the network equipment.

The processor 21 can implement or execute various exemplary logic blocks, modules and circuits described by the contents of the present disclosure. The processor 21 can be a central processing unit, a general-purpose processor, a digital signal processor, an application-specific integrated circuit, a field-programmable gate array or other programmable logic devices, a transistor logic device, a hardware component or any combination thereof. The processor 21 can implement or execute various logic blocks, modules and circuits described by the contents of the present disclosure. The processor 21 can also be a combination for implementing a computation function, for example, a combination of one or more microprocessors or the like.

The transceiver 22 can also be replaced by a transceiver circuit, a system interface or the like in the network equipment.

The storage 23 can be a memory or the like in the network equipment. The memory can include a volatile memory, for example, a random access memory. The memory can also include a non-volatile memory, for example, a read-only memory, a flash memory, a hard disk or a solid state disk. The memory can further include a combination of the above memories.

The bus 24 can be an Extended Industry Standard Architecture (EISA) bus or the like. The bus 24 can be classified into an address bus, a data bus, a control bus or the like. For convenience of expression, the bus is expressed by only one bold line in FIG. 7, but it does not mean that there is only one bus or one type of buses.

The identical or similar portions of the embodiments in the specification can refer to each other, and the emphasis of each embodiment is different from that of other embodiments. Particularly, for the device embodiments, since these embodiments are basically similar to the method embodiments, the device embodiments are described simply, and the related description can refer to the partial description of the method embodiments.

An embodiment of the present disclosure provides a computer-readable storage medium 25, on which computer programs are stored. When the computer programs are loaded on a computer and executed by the computer, the computer is allowed to execute the data processing method described above.

For example, the computer-readable storage medium 25 can include but not be limited to: electrical, magnetic, optical, electromagnetic, infrared or semiconductor systems, apparatuses or device, or any combination thereof. For a more specific example (a non-exhaustive list), the computer-readable storage medium 25 includes: an electric connection having one or more leads, a portable computer disk, a hard disk, a Random Access Memory (RAM), a Read-Only Memory (ROM), an Erasable Programmable Read Only Memory (EPROM), an optical fiber, a portable Compact Disc Read-Only Memory (CD-ROM), an optical storage device, a magnetic storage device or any appropriate combination thereof. In the embodiments of the present disclosure, the computer-readable storage medium 25 can be any tangible medium containing or stored with programs. The programs can be instructed to be executed as a system, an apparatus or a device or used with a system, an apparatus or a device.

The foregoing description merely shows the specific implementations of the present disclosure, but the protection scope of the present disclosure is not limited thereto. Any variation or replacement made within the technical scope of the present disclosure shall fall into the protection scope of the present disclosure. Accordingly, the protection scope of the present disclosure shall be subject to the protection scope defined by the claims.

What is claimed is:

1. A network equipment, comprising a processor and a memory, wherein,
   computer-executable instructions are stored in the memory, and when the network equipment operates, the processor executes the computer-executable instructions stored in the memory, so that the network equipment executes the steps of
   acquiring index data of a product in N dimensions, the N being a natural number greater than or equal to 1;
   normalizing index data in the $i^{th}$ dimension to determine a result of evaluation of the product in the $i^{th}$ dimension, the i being a natural number that is greater than or equal to 1 but less than or equal to N; and
   generating a QR code for the product, the QR code carrying the results of evaluation in the N dimensions, wherein
   the step of normalizing index data in the $i^{th}$ dimension to determine a result of evaluation of the product in the $i^{th}$ dimension comprises:
   if the $i^{th}$ dimension comprises at least two pieces of index data, determining, according to a preset correspondence between index data in the $i^{th}$ dimension and scores, a score for each piece of index data in the $i^{th}$ dimension; and
   determining a result of evaluation of the product in the $i^{th}$ dimension according to the following formula:

$$P = \sum_{j=1}^{n} F_j \times \alpha_j,$$

where P denotes the result of evaluation of the product in the $i^{th}$ dimension, $F_j$ denotes a score corresponding to the $j^{th}$ piece of index data of the product in the $i^{th}$ dimension, $\alpha_j$ denotes a weight value corresponding to the $j^{th}$ piece of index data of the product in the $i^{th}$ dimension, and n is a natural number greater than 1.

2. The network equipment according to claim 1, wherein, the step of generating a QR code for the product comprises:
   generating, according to the result of evaluation in the $i^{th}$ dimension, a data point on the $i^{th}$ coordinate axis, and successively connecting data points on adjacent coordinate axes to generate a radar graph of the product;
   generating a QR code body region for the product from the results of evaluation of the product in the N dimensions; and
   generating a visual QR code for the product by using the radar graph of the product as a background graph and in combination with the QR code body region for the product.

3. The network equipment according to claim 1, wherein the network equipment, after executing the step of determining a result of evaluation of the product in the $i^{th}$ dimension, further executes the step of:
   comparing the result of evaluation in the $i^{th}$ dimension with result(s) of evaluation of at least one other product of the same type in a corresponding dimension to determine a rank of the product in the $i^{th}$ dimension; and
   the step of generating a QR code for the product comprises:
   generating a QR code for the product according to the results of evaluation and the ranks in the N dimensions, the QR code carrying the results of evaluation and the ranks of the product in the N dimensions.

4. The network equipment according to claim 1, wherein the network equipment, after executing the step of normalizing index data in the $i^{th}$ dimension to determine a result of evaluation of the product in the $i^{th}$ dimension, further executes the step of
   receiving a modification instruction transmitted by a user terminal; and
   modifying, according to the modification instruction, the result of evaluation of the product in the $i^{th}$ dimension.

5. A non-transitory computer-readable storage medium with instructions stored therein, wherein, when the instructions are executed by a computer equipment, the computer equipment executes steps of:
   acquiring index data of a product in N dimensions, the N being a natural number greater than or equal to 1;
   normalizing index data in the $i^{th}$ dimension to determine a result of evaluation of the product in the $i^{th}$ dimension, the i being a natural number that is greater than or equal to 1 but less than or equal to N; and
   generating a QR code for the product, the QR code carrying the results of evaluation in the N dimensions, wherein
   the step of normalizing index data in the $i^{th}$ dimension to determine a result of evaluation of the product in the $i^{th}$ dimension comprises:
   if the $i^{th}$ dimension comprises at least two pieces of index data, determining, according to a preset correspondence between index data in the $i^{th}$ dimension and scores, a score for each piece of index data in the $i^{th}$ dimension; and determining a result of evaluation of the product in the $i^{th}$ dimension according to the following formula:

$$P = \sum_{j=1}^{n} F_j \times \alpha_j,$$

where P denotes the result of evaluation of the product in the $i^{th}$ dimension, $F_j$ denotes a score corresponding to the $j^{th}$ piece of index data of the product in the $i^{th}$ dimension, $\alpha_j$ denotes a weight value corresponding to the $j^{th}$ piece of index data of the product in the $i^{th}$ dimension, and n is a natural number greater than 1.

6. The non-transitory computer-readable storage medium according to claim 5, wherein, the step of generating a QR code for the product comprises:
generating, according to the result of evaluation in the $i^{th}$ dimension, a data point on the $i^{th}$ coordinate axis, and successively connecting data points on adjacent coordinate axes to generate a radar graph of the product;
generating a QR code body region for the product from the results of evaluation of the product in the N dimensions; and
generating a visual QR code for the product by using the radar graph of the product as a background graph and in combination with the QR code body region for the product.

7. The non-transitory computer-readable storage medium according to claim 5, wherein the computer equipment, after executing the step of determining a result of evaluation of the product in the $i^{th}$ dimension, further executes a step of:
comparing the result of evaluation in the $i^{th}$ dimension with result(s) of evaluation of at least one other product of the same type in a corresponding dimension to determine a rank of the product in the $i^{th}$ dimension; and
the step of generating a QR code for the product comprises:
generating a QR code for the product according to the results of evaluation and the ranks in the N dimensions, the QR code carrying the results of evaluation and the ranks of the product in the N dimensions.

8. The non-transitory computer-readable storage medium according to claim 5, wherein the computer equipment, after executing the step of normalizing index data in the $i^{th}$ dimension to determine a result of evaluation of the product in the $i^{th}$ dimension, further executes a step of:
receiving a modification instruction transmitted by a user terminal; and
modifying, according to the modification instruction, the result of evaluation of the product in the $i^{th}$ dimension.

* * * * *